Aug. 25, 1953
A. E. ANDERSON
2,650,179
METHOD OF AND APPARATUS FOR WASHING MILKING MACHINES
Filed May 8, 1948
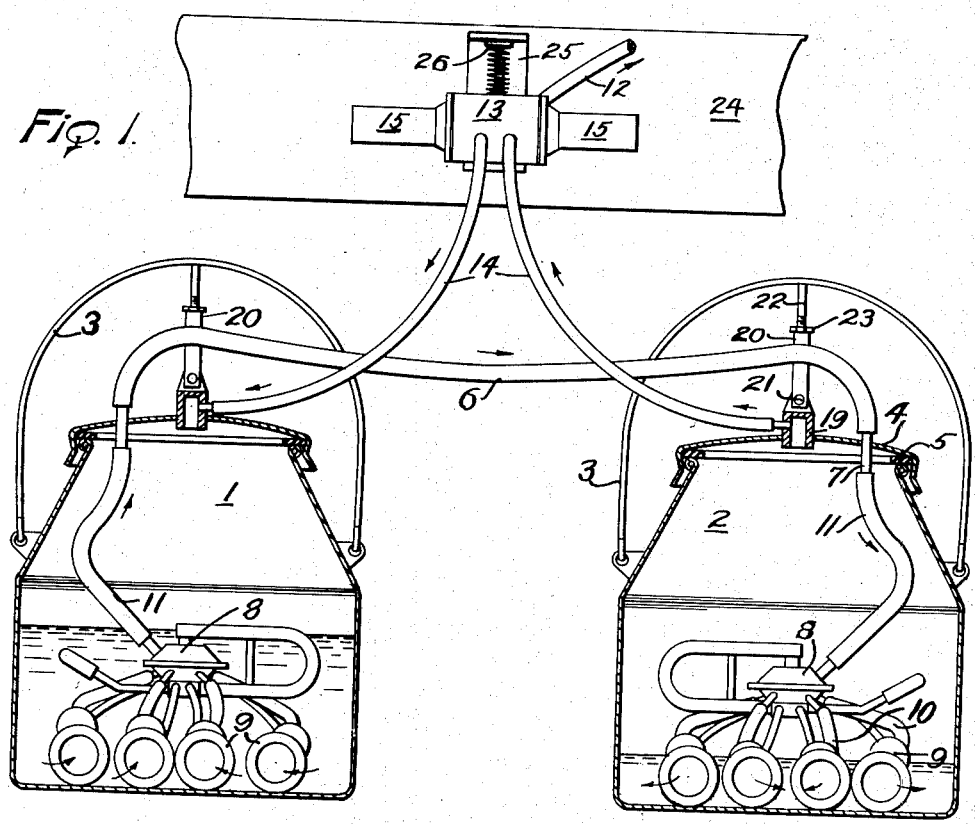
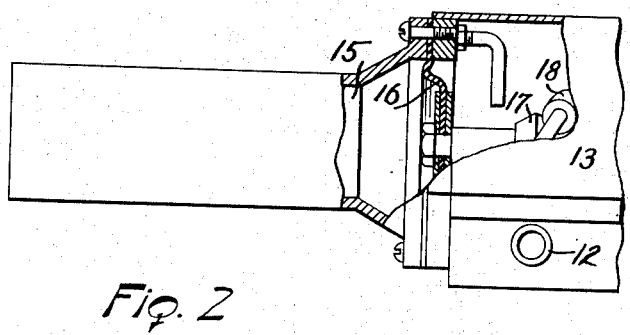
INVENTOR.
Austin E. Anderson
BY Beau, Brooks, Buckley & Beau.
ATTORNEYS.

Patented Aug. 25, 1953

2,650,179

UNITED STATES PATENT OFFICE 2,650,179

METHOD OF AND APPARATUS FOR WASHING MILKING MACHINES

Austin E. Anderson, Jamestown, N. Y.

Application May 8, 1948, Serial No. 25,947

5 Claims. (Cl. 134—22)

1

This invention relates to dairy equipment and particularly to a method of and apparatus for cleansing the milk passages of milking machines.

It has heretofore been proposed to flow a cleansing solution through a claw and teat cup assemblage in an effort to secure the utmost sanitation. The chief advantage of this method is the simplicity of the procedure.

The present invention has for its object to improve this flow procedure whereby a more thorough and efficient cleansing is accomplished. Further, the invention has for its object to provide an improved method of washing the claw and teat cup unit or assemblage, or parts thereof, the term washing being inclusive of any liquid treating action.

The invention further resides in an improved washing system or apparatus by which the flow treatment of the claw and cup assemblage is greatly facilitated for reconditioning the milker for its next use.

The foregoing and other objects will manifest themselves as this description progresses, reference being had to the accompanying drawing wherein Fig. 1 is a view depicting the general layout of the system and showing the washing chambers in section; and Fig. 2 is a fragmentary view of the flow directing and turbulence creating pulsator.

Referring more particularly to the drawing, the numerals 1 and 2 designate plural washing chambers, which may be in the form of pails having carrying bails 3. The closures 4 for the chambers, shown as covers for the pails, have sealing gaskets 5 which enable airtight seals when pressed firmly upon the rims of the pails. The correct amount of washing solution is poured into one or both of the chambers. A transfer passage 6 joins the washing chambers and opens thereinto through nipples 7 to which latter are attached the milking machine parts to be cleansed. Herein these milker parts are the claw 8 and the connected clusters of cups 9 to which they are joined by hose 10. These parts constitute a unit or assemblage which is communicatively attached to the nipples 7 by a length of hose 11.

The operating pressure supply line 12, which leads from a suitable source of supply, is alternately placed in communication with the two washing chambers by means of a pulsator 13 and the branch passages 14, the unconnected chamber being vented to the atmosphere. The operating pressure may be either above or below atmos-

2 pheric and for the purposes of this description subatmospheric pressure will be considered as the operating pressure.

With the parts arranged as illustrated in Fig. 1 and the suction line connected to the chamber 2, the path of air and liquid flow will follow the arrows with the result that the air pressure in the chamber 2 will be subatmospheric, that in chamber 1 will be atmospheric, and the washing or sterilizing liquid will be drawn over into chamber 2 through the transfer passage 6 as well as through the terminally attached claw and cup assemblages. After a predetermined time interval the pulsator will switch the suction connection to the chamber 1 and thereby reverse the pressure differential so that the atmospheric pressure will displace the washing solution back into chamber 1. This washing solution transfer will continue back and forth at regular intervals throughout the cup washing operation, the solution moving first from one chamber into the other, and then vice versa, and each time flushing through the cup and claw passages with rapid movement. While these reversals in the direction of liquid flow will usually clean out such passages the present invention comprehends a further feature toward a thorough cleansing action against any milk particles or foreign matter adhering to the walls of the passage or in cavities thereof. To this end special provision is made to agitate the washing solution in a manner for setting up a marked turbulence in the liquid as it flows from one chamber to the other. This is accomplished herein by prolonging the intervals of communication of the chambers with the suction line before reversing the liquid flow whereby the atmospheric air is given opportunity to enter the cups along with the liquid when the liquid level falls sufficiently to expose the cup openings, or substantially so.

Accordingly the air compartments 15 of the pulsator 13 are enlarged to require a greater air displacement or evacuation before the pressure responsive pistons or diaphragms 16 are moved to shift the double cam 17 to reverse the valve action indicated generally by the numeral 18. This pulsator mechanism may be of any approved type although that illustrated herein is similar to that shown in my Patent No. 2,304,746 granted December 8, 1942. By enlarging the capacity of the pulsator compartments 15 a longer interval is required to evacuate the air content thereof to a degree sufficient to provide the necessary pressure differential to shift the valve reversing cam 17 whereby one compartment will be placed in communication with the source of suction for evacuating the air content of the companion washing chamber. Whenever this reversal takes place, the liquid content of the vented washing chamber will be displaced by the air pressure differential over into the companion chamber and as the displacement of a predetermined volume of the washing solution nears completion the atmospheric air will gurgle into the several teat cups and agitate the solution therein to cause a turbulent condition for swishing the solution through the milk passages. The result is that any adhering foreign particles will be shaken from the passage walls and carried along with the liquid stream over into the companion washing chamber. The duration of this period of turbulence will depend upon the capacity of the pulsator compartments 15 as well as the restriction afforded by the pulsator bleed passages. Furthermore, the turbulent action of the washing fluid will be increased by placement of the teat cups upon their sides in the bottom of the respective washing chambers.

The branch suction passages 14 may enter their respective chambers through fittings 19, the latter serving also as supports for the struts 20 which are employed to hold the covers 4 in position, these struts comprising a sleeve section pivoted at 21 and having an extensible section 22 threaded therein for reacting against the bail 3. The length of the strut being once obtained, may be secured by means of a jam nut 23. By reason of the location of the pivot 21 the strut may be swung laterally to disengage the bail, the outer end of the strut being formed with a seat to receive the bail when in its operative position. The flow directing and turbulence creating pulsator 13 may be mounted on a suitable support 24 by a generally C-shaped bracket 25, the underside of the pulsator engaging in a seat where it is retained by a resilient spring detent 26.

The improved method and apparatus for washing the claw and cup assemblages is simple and yet effective in thoroughly cleansing the units, and while the foregoing description has been in detail it is without thought of limitation since the inventive thoughts disclosed are capable of assuming other physical embodiments without departing from the spirit of the invention and the scope of the appended claims.

What is claimed is:

1. Washing apparatus for the claw and teat cup assemblages of a milking machine, comprising a pair of liquid containing chambers, closure means sealing and giving access to the same, a transfer passage connecting the two chambers and having its opposite ends connectible to respective claw and cup assemblages in the chambers for opening into the latter through the milk passages of the cups, and a pulsator connected to the two chambers and acting first to connect one chamber to a source of operating pressure and the companion chamber to the atmosphere concurrently and then to reverse the connections to displace the liquid alternately from one chamber to the other through the milk passages of the claw and cup assemblages and the connecting transfer passage.

2. Washing apparatus for the claw and teat cup assemblage of a milking machine, comprising a pair of liquid containing chambers, closure means sealing and giving access to the same, a transfer passage connecting the two chambers through the closure means and terminating in each chamber with means for communicatively attaching a claw and cup assemblage thereto for fluid flow back and forth from one chamber through the assemblage therein and the transfer passage into the other chamber through the assemblage in the latter, means supplying air pressure to the chambers for effecting such displacement, and pressure responsive means operating to confine the air pressure to one chamber at a time while venting the companion chamber to the atmosphere.

3. Washing apparatus for the claw and teat cup assemblage of a milking machine, comprising a pair of liquid containing chambers, closure means sealing and giving access to the same, a transfer passage connecting the two chambers and terminating in each chamber with means for communicatively attaching a claw and cup assemblage thereto for fluid flow back and forth from one chamber through the assemblage therein and the transfer passage into the other chamber through the assemblage in the latter, a suction line, and pressure responsive means alternately acting to establishing communication between the suction line and the two chambers while venting the companion one of the chambers to the atmosphere.

4. A method of washing milking machine teat cups, consisting in placing the cups on their sides in a submerging volume of liquid within a chamber, then displacing the liquid from the chamber through the cups by a gas pressure until the liquid level falls sufficiently to admit pressure gas into the cups along with the liquid for agitating the latter, and maintaining the gas pressure for a predetermined time interval to produce a prolonged period of turbulence within the cups.

5. A washing system for cleansing the milk passages of milking machine units, comprising plural containers, covers for the containers having a pressure connection and a unit connection therethrough, a transfer passage joining the two unit connections, and means connected to the pressure connections and operable to vent one container to the atmosphere while connecting the companion container to a source of operating pressure to displace a washing solution from one container to the other through the transfer passage and the terminally connected units, and pressure responsive means for reversing the pressure differential in the two containers.

AUSTIN E. ANDERSON.

References Cited in the file of this patent

UNITED STATES PATENTS

| Number | Name | Date |
|---|---|---|
| 148,130 | Moore | Mar. 3, 1874 |
| 700,764 | Hardy | May 27, 1902 |
| 1,036,941 | Weiss | Aug. 27, 1912 |
| 1,189,363 | Karolle | July 4, 1916 |
| 1,353,127 | Ferdon | Sept. 14, 1920 |
| 1,627,824 | Beaty | May 10, 1927 |
| 1,645,356 | Shurts | Oct. 11, 1927 |
| 1,701,824 | Robinson | Feb. 12, 1929 |
| 2,035,513 | Speranza | Mar. 31, 1936 |
| 2,225,350 | Rankin | Dec. 17, 1940 |
| 2,228,520 | Hodsdon | Jan. 14, 1941 |
| 2,233,852 | Schmitt | Mar. 4, 1941 |